UNITED STATES PATENT OFFICE.

GERHARD NICOLAAS VIS, OF SCHWEIZERHALLE, SWITZERLAND.

PROCESS OF PURIFYING BRINE.

SPECIFICATION forming part of Letters Patent No. 658,303, dated September 18, 1900.

Application filed May 3, 1899. Serial No. 715,480. (No specimens.)

*To all whom it may concern:*

Be it know that I, GERHARD NICOLAAS VIS, doctor of philosophy and chemist, a subject of the Queen of the Netherlands, residing at Schweizerhalle, near Basel, Switzerland, have invented a new and useful Process for the Purification of Brine; and I do hereby declare that the following is a full, clear, and exact description of the invention, which will enable others skilled in the art to which it appertains to make and use the same.

The present invention relates to the purification of brine; and it consists of an improved process for removing the calcium sulfate or gypsum contained in the brine in dissolved state.

In a prior application, Serial No. 700,098, filed December 23, 1898, I have described a process for purifying brine by means of an addition of a solution of calcium chloride, whereby the sulphates of sodium, potassium, and magnesium present in the brine are transformed into calcium sulfate, which precipitates, and a large percentage of the calcium sulphate originally present in the brine is caused to separate out. This process is especially advantageous for places where solutions of calcium chloride are to be had at a low cost—as, for instance, in the neighborhood of soda-works. In other places this process may be as costly as the old method of removing the gypsum by means of soda (carbonate of sodium) or other known precipitates. I have found that a similar effect as that produced by the addition of calcium chloride will be brought about by dissolving in the brine a convenient quantity of easily-soluble sulfates. This procedure has also the effect of causing a large percentage of the gypsum to separate out, so that a comparatively-small quantity of soda or other precipitant will suffice to complete the removal of gypsum. Of said sulfates I prefer to use sodium sulfate or Glauber salt. The purifying effect of said addition of sodium of sulfate may be seen from the following table, taking the brine of Schweizerhalle, near Basel, as an example. Normally this brine contains 5.868 kilograms of gypsum ($CaSO_4$) per cubic meter to be precipitated. This quantity of gypsum would require 4.573 kilograms of sodium carbonate, ($Na_2CO_3$:)

| Sodium sulfate added to one cubic meter of brine. | CaO contained in one hundred cubic centimeters of the treated brine after filtration. | Gypsum contained in one cubic meter of the brine treated. | $Na_2CO_3$ (soda) required for precipitating this remainder of gypsum. |
|---|---|---|---|
| Kilograms. | Grams. | Kilograms. | Kilograms. |
| 5. | 0.1965 | 4.775 | 5.72 |
| 10. | 0.1257 | 3.055 | 2.38 |
| 15. | 0.0933 | 2.267 | 1.766 |
| 20. | 0.0697 | 1.693 | 1.329 |

Gypsum removed from one cubic meter of brine by the addition of sulfate as in the first column.

Kilograms.
1.096
2.816
3.604
4.175

The separation of the gypsum is accelerated if the brine, after the addition of the sufate, is kept constantly stirred for twenty-four hours, about, or once boiled up or heated to a lower degree for a longer period, which may be shortened by stirring. After the separation of the brine from the precipitated gypsum the remainder of dissolved gypsum is removed from the former in the usual manner by the usual means for this purpose, preferably by means of sodium carbonate.

The quantity of sulfate to be applied in the first phase of the process must be calculated according to the amount of gypsum known or determined by analysis to be contained in the brine.

The gypsum separated from the brine is of a very fine quality, and by its industrial use the cost of the soda or other precipitant may be largely reduced.

In carrying the process into effect the Schweizerhalle brine, for instance, is treated as follows: To every cubic meter of this brine are added about fifteen kilograms of sodium sulfate. When the latter is completely dissolved, the compound solution may once be boiled up—*i. e.*, heated to about 107° centigrade, if fuel is cheap. In general we prefer to keep said compound solution constantly stirred for about twenty-four hours. An abundant precipitation of gypsum takes place. The precipitate is then allowed to settle and the brine drawn off. The latter now contains only 2.276 grams of calcium sulfate per liter. This remainder of gypsum is then precipitated in the usual manner by treating the brine with one or more of the well-known means for converting gypsum into calcium carbonate. I prefer to use sodium carbonate, as in reacting with the gypsum it is transformed into sulfate of sodium. The sodium carbonate is added in the quantity needed for the conversion of the entire remainder of gypsum, which is to be determined by chemical test in the ordinary manner, and the mixture stirred or heated and stirred for awhile, when the calcium carbonate formed is allowed to settle, and finally the brine is separated from the precipitate.

To obtain the chloride of sodium (common salt) contained in the purified brine free from gypsum, the brine is evaporated in the usual manner. The mother-liquor remaining after the removal of the salt crystals contains the sodium sulfate originally added, as well as that formed by the addition of soda, and is utilized in a subsequent process.

What I claim as my invention, and desire to secure by Letters Patent of the United States, is—

1. The process of purifying brine from gypsum which consists in dissolving in the brine to be treated a quantity of an easily-soluble sulfate exceeding the percentage of gypsum present, maintaining the liquor for some time in a state of motion, removing the gypsum separated out, treating the liquor with a reagent capable of transforming the remainder of dissolved gypsum into an indissoluble calcium compound, and separating the liquor from the precipitate, substantially as and for the purposes specified.

2. The process of purifying brine from gypsum which consists in dissolving in the brine to be treated a quantity of sodium sulfate exceeding the percentage of gypsum present, stirring the liquor, removing the gypsum separated out, treating the liquor with sodium carbonate, and separating it from the precipitate, substantially as and for the purposes specified.

In testimony whereof I have hereunto set my hand in presence of two subscribing witnesses.

GERHARD NICOLAAS VIS.

Witnesses:
GEORGE GIFFORD,
ALBERT GRAETER.